(12) United States Patent  
Liang et al.

(10) Patent No.: US 11,089,198 B2  
(45) Date of Patent: Aug. 10, 2021

(54) REMOTE CONTROLLER AND PHOTOGRAPHING DEVICE

(71) Applicant: SZ DJI OSMO TECHNOLOGY CO., LTD., Shenzhen (CN)

(72) Inventors: Guibin Liang, Shenzhen (CN); Jian Yang, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/726,561

(22) Filed: Dec. 24, 2019

(65) Prior Publication Data

US 2020/0137292 A1  Apr. 30, 2020

Related U.S. Application Data

(63) Continuation of application No. PCT/CN2017/096116, filed on Aug. 4, 2017.

(51) Int. Cl.
*H04N 5/232* (2006.01)
*G03B 17/56* (2021.01)
*F16M 11/18* (2006.01)

(52) U.S. Cl.
CPC ....... *H04N 5/23203* (2013.01); *G03B 17/561* (2013.01); *F16M 11/18* (2013.01)

(58) Field of Classification Search
CPC .......................... H04N 5/23203; G03B 17/561
See application file for complete search history.

(56) References Cited

U.S. PATENT DOCUMENTS 6,608,461 B1   8/2003   Salamati

FOREIGN PATENT DOCUMENTS

| CN | 201895687 U | 7/2011 |
| CN | 103029834 A | 4/2013 |
| CN | 203838864 U | 9/2014 |
| CN | 204883391 U | 12/2015 |
| CN | 105817038 A | 8/2016 |
| CN | 205485628 U | 8/2016 |
| CN | 205810092 U | 12/2016 |
| CN | 207049552 U | 2/2018 |
| CN | 207115203 U | 3/2018 |
| GB | 191205304 A | 7/1912 |
| JP | 2010083228 A | 4/2010 |
| KR | 20110051753 A | 5/2011 |

(Continued)

OTHER PUBLICATIONS

Built for Gimbals and Pre-Viz, These Are Hand Wheels for the Modern Age Renée https://nofilmschool.com/2016/07/alpha-wheels-gimbals-pre-viz (Year: 2017).*

(Continued)

*Primary Examiner* — Clayton E. LaBalle
*Assistant Examiner* — Dennis Hancock
(74) *Attorney, Agent, or Firm* — Anova Law Group, PLLC

(57) ABSTRACT

A remote control for controlling a gimbal includes a body configured to carry a battery, a first wheel assembly and a second wheel assembly mounted on the body. The first wheel assembly includes a first wheel, and the second wheel assembly includes a second wheel. The first wheel and the second wheel can rotate under a driving force to control at least two axle movement of the gimbal.

20 Claims, 14 Drawing Sheets

(56) References Cited

FOREIGN PATENT DOCUMENTS

SU      1614826 A1    12/1990
WO    2017106094 A2    6/2017

OTHER PUBLICATIONS

CineMilled presents—Alpha Wheels gimbal control. Precision control for Ronin, MoVI & Tilta gimbals m3pedro https://www.youtube.com/watch?v=tkT00MJOeJs (Year: 2017).*
Alpha Wheels https://1a.tools/alpha-wheels (Year: 2017).*
Alpha Wheels User Manual (Year: 2017).*
DJI Master Wheels 3-Axis https://advexure.com/products/dji-master-wheels-3-axis (Year: 2018).*
The World Intellectual Property Organization (WIPO) International Search Report for PCT/CN2017/096116 dated May 3, 2018 8 pages.

* cited by examiner

REMOTE CONTROLLER AND PHOTOGRAPHING DEVICE

CROSS-REFERENCE TO RELATED APPLICATION

This application is a continuation of International Application No. PCT/CN2017/096116, filed Aug. 4, 2017, the entire content of which is incorporated herein by reference.

TECHNICAL FIELD

The disclosure relates to a remote controller and a photographing device, and in particular relates to the technical field of photographing device for film and television production.

BACKGROUND

With the development of network technologies, the number of films and televisions such as movies, TV series and documentaries are increasing each year. In the film and television production, due to the need of camera shooting or limitation of the scene, oftentimes, remote control of the video camera is necessary for shooting. Therefore, it is necessary to use a remote control to control a gimbal that carries the camera, for example, a three-axis stabilizing gimbal. However, the existing remote controls are rocker-type remote controls, originally designed to operate objects in video games and now also used to control unmanned aerial vehicles (UAVs), toy cars, or aircraft models. Therefore, in designing the rocker-type remote controls, there is a function of returning to midpoint in rocker design to facilitate the operator to better control the rocker, that is, when the rocker is moved up and down or left and right, and when the applied driving force disappears, the rocker automatically returns to the midpoint for the operator to perform the next operation. However, due to the existence of the force for returning to midpoint, accordingly, the control over the objects is not linear control, but similar to a sinusoidal control, which makes it difficult to accurately control the rotation of the gimbal.

SUMMARY

In accordance with the disclosure, there is provided a remote control for controlling a gimbal. The remote control includes a body configured to carry a battery, and a first wheel assembly and a second wheel assembly mounted on the body. The first wheel assembly includes a first wheel, and the second wheel assembly includes a second wheel. The first wheel and the second wheel rotate under a driving force to control at least two axle movement of the gimbal.

Also in accordance with the disclosure, there is provided a photographing device. The photographing device includes a gimbal, a camera mounted on the gimbal, and a remote control wirelessly connected to the gimbal. The remote control includes a body configured to carry a battery, and a first wheel assembly and a second wheel assembly mounted on the body. The first wheel assembly includes a first wheel, and the second wheel assembly includes a second wheel. The first wheel and the second wheel rotate under a driving force to control at least two axle movement of the gimbal.

Figure 1:
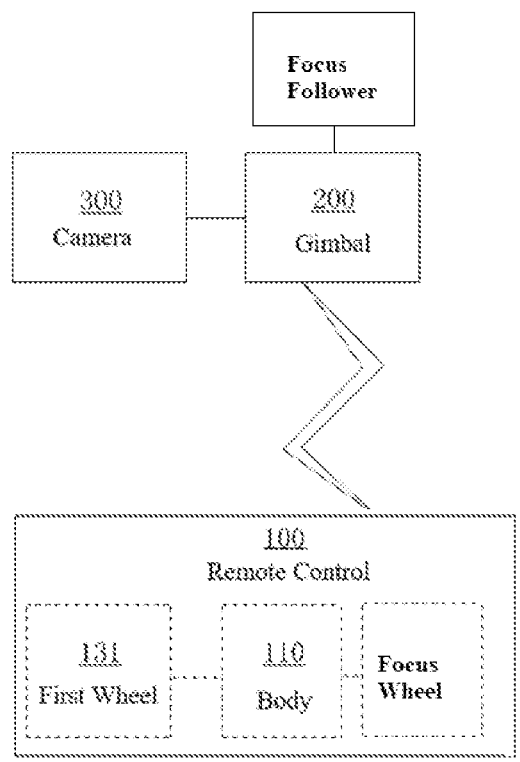
FIG. 1 is a schematic structural diagram of a photographing device according to some embodiment of the present disclosure.

Reference numerals: 100, remote control; 110, body; 120, wireless communication device; 121, antenna; 123, main body; 125, interface; 127, knob; 129, pin plug; 131, first wheel assembly; 1311, first wheel; 1312, handle; 1313, connecting portion; 1314, rotational speed control knob; 1315, adjustment knob; 1316, switch; 133, second wheel assembly; 1331, second wheel; 1332, handle; 1333, connecting portion; 1334, rotational speed control knob; 1335, adjustment knob; 1336, switch; 135, third wheel assembly; 1351, third wheel; 1352, handle; 1353, connecting portion; 1354, rotational speed control knob; 1355, adjustment knob; 1356, switch; 141, power switch; 142, camera switch; 143, home button; 144, focus button; 145, focus knob; 146, aperture adjustment knob; 147, output interface; 148, expansion interface; 150, controller; 161, guiding member; 1611, positioning post; 162, rotation axle; 163, guide groove; 164, fixing plate; 165, trapezoidal slider; 166, positioning plate; 167, screw; 168, positioning groove; 169, locking knob; 170, battery; 181, tongue of tongue-and-groove connection; 1811, flange; 183, connecting block; 1831, groove; 1833, limiting groove; 185, locking knob; 190, display; 191, display battery; 200, gimbal; 300, camera.

DETAILED DESCRIPTION OF THE EMBODIMENTS

The Some embodiments of the present disclosure are described in detail below with reference to the accompanying drawings. The features of the embodiments and examples described below can be combined with each other without conflict.

FIG. 1 is a schematic structural diagram of a photographing device according to some embodiment of the present disclosure. As shown in FIG. 1, the photographing device of the present embodiment includes: a remote control 100, a gimbal 200 and a camera 300. The gimbal 200 may be fixed on the ground or other fixed objects (e.g., houses, trees, rocks, etc.), or may be mounted on a movable object (e.g., a car, a rail vehicle, UAV, etc.). In this embodiment, the gimbal 200 may be a gimbal of any structure in the existing technology, such as a two-axis gimbal or a three-axis stabilizing gimbal. The camera 300 is mounted on the gimbal 200, and a shooting direction and shooting angle of the camera 300 can be adjusted by adjusting an altitude of gimbal 200, to realize a multi-angle and multi-directional shooting to obtain images or video source materials required by a photographer, thereby facilitating later clipping and editing for producing TV series or self-media videos. In the present embodiment, the adjustment of the attitude of the gimbal 200 is realized by the remote control 100 wirelessly connected to the gimbal 200, and a specific structure of the remote control 100 will be described in detail later. Through the remote control 100, the photographer can control the shooting direction and shooting angle of the camera 300 at a long distance, thereby obtaining better source materials, to entail more realistic scenery performance for post-production film and television materials. For example, the camera 300 mounted on the UAV can be controlled by the remote control 100 to capture the real-time performance of an athlete climbing on a cliff, or to take a long-range shot of a lion preying on a prairie, or to take a top view from the sky of a battle scene in historical films and televisions, etc.

Figure 2:
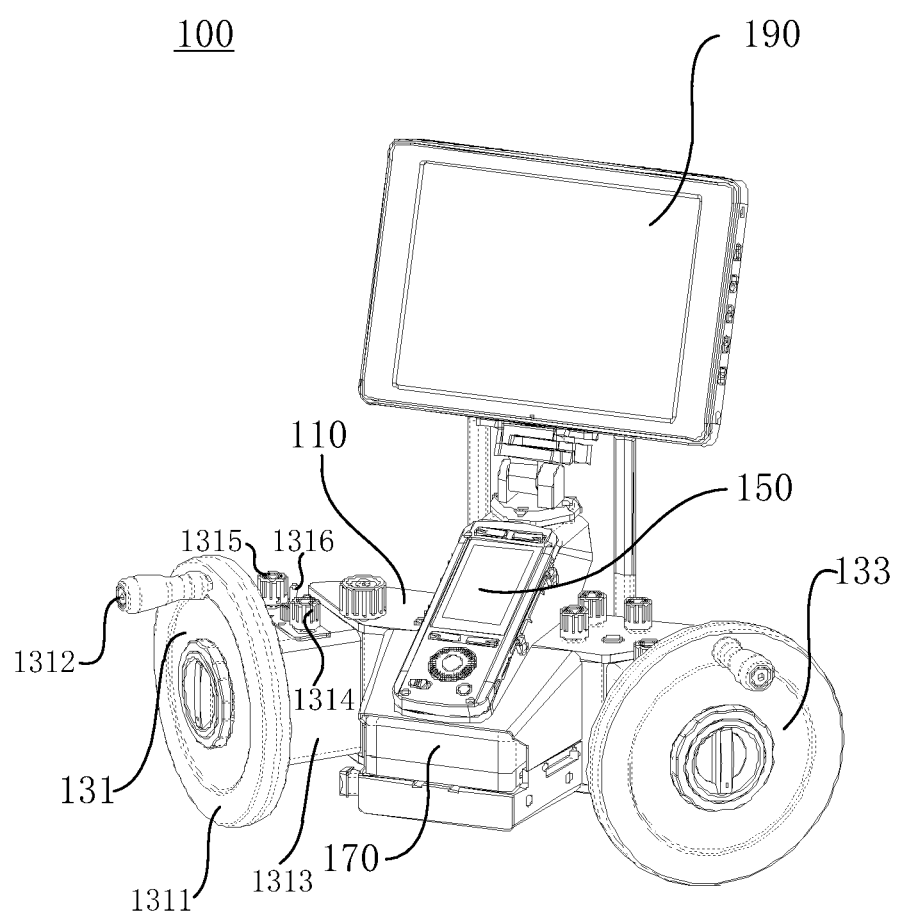
FIG. 2 is a schematic structural diagram of a remote control according to some embodiment of the present disclosure.
Figure 3:
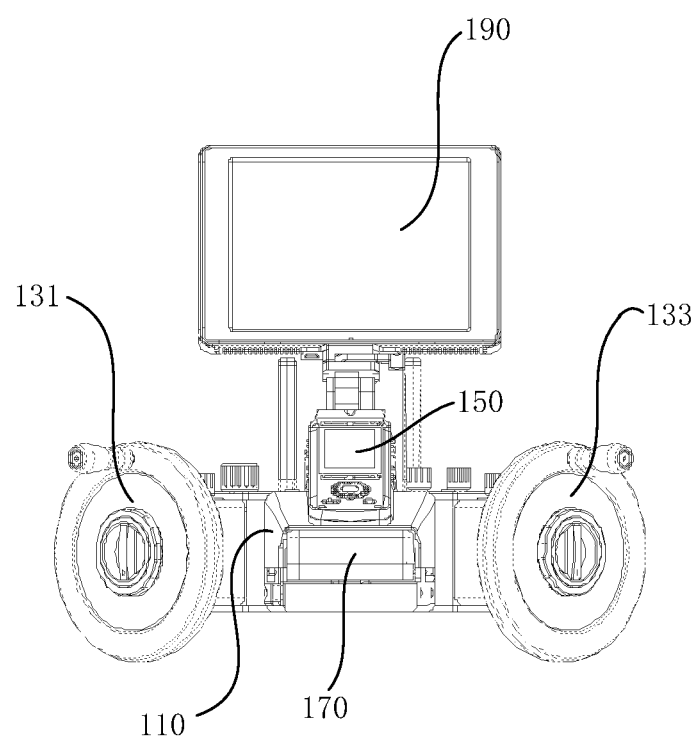
FIG. 3 illustrates a front view of FIG. 2.
Figure 4:
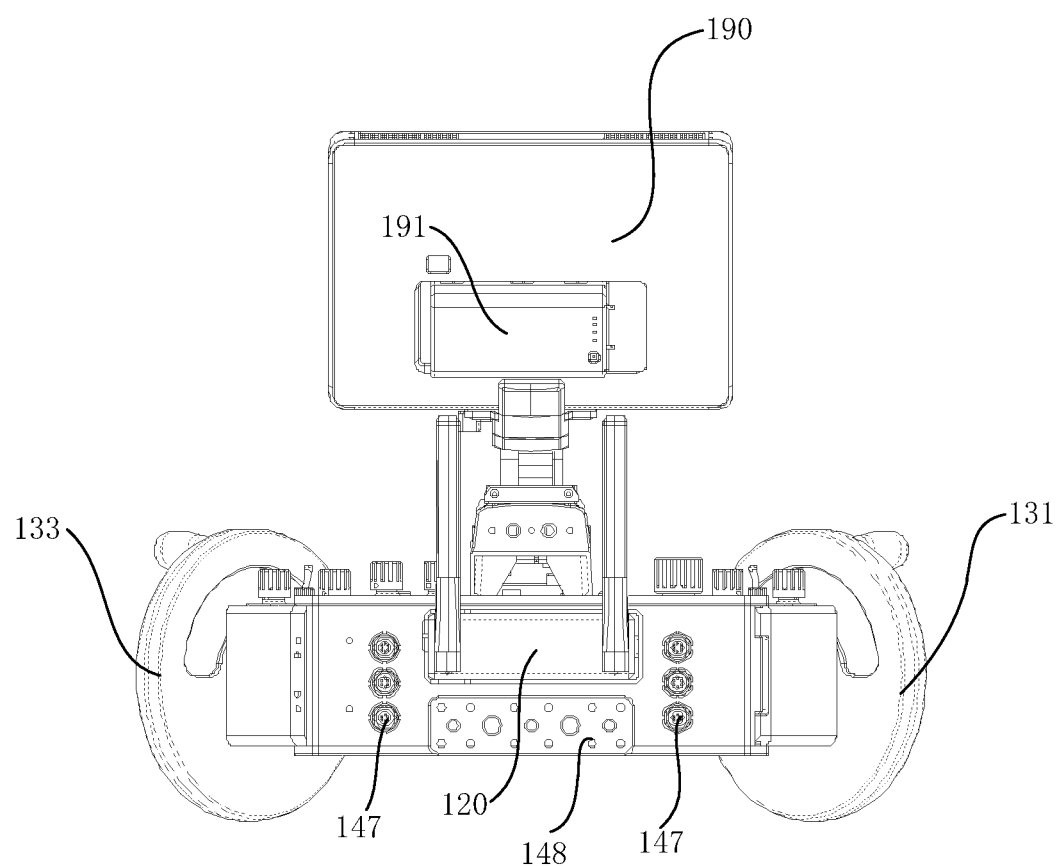
FIG. 4 illustrates a rear view of FIG. 2.
Figure 5:
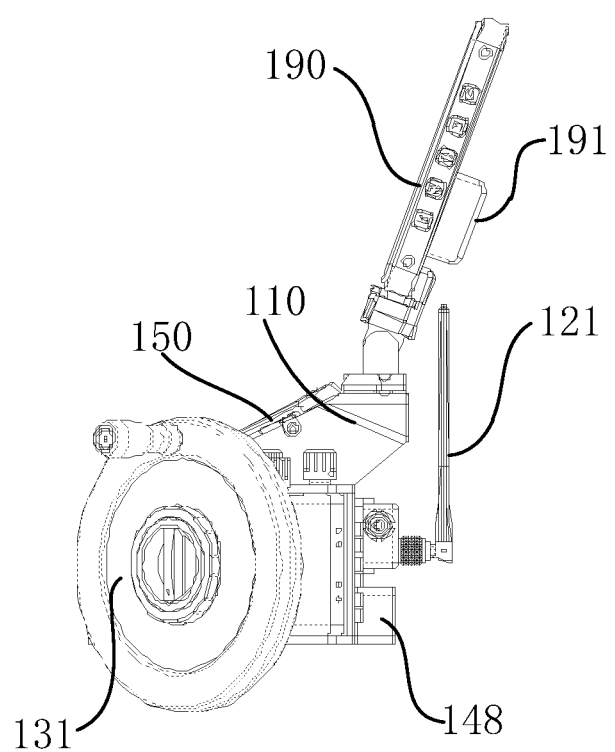
FIG. 5 illustrates a right view of FIG. 2.
Figure 6:
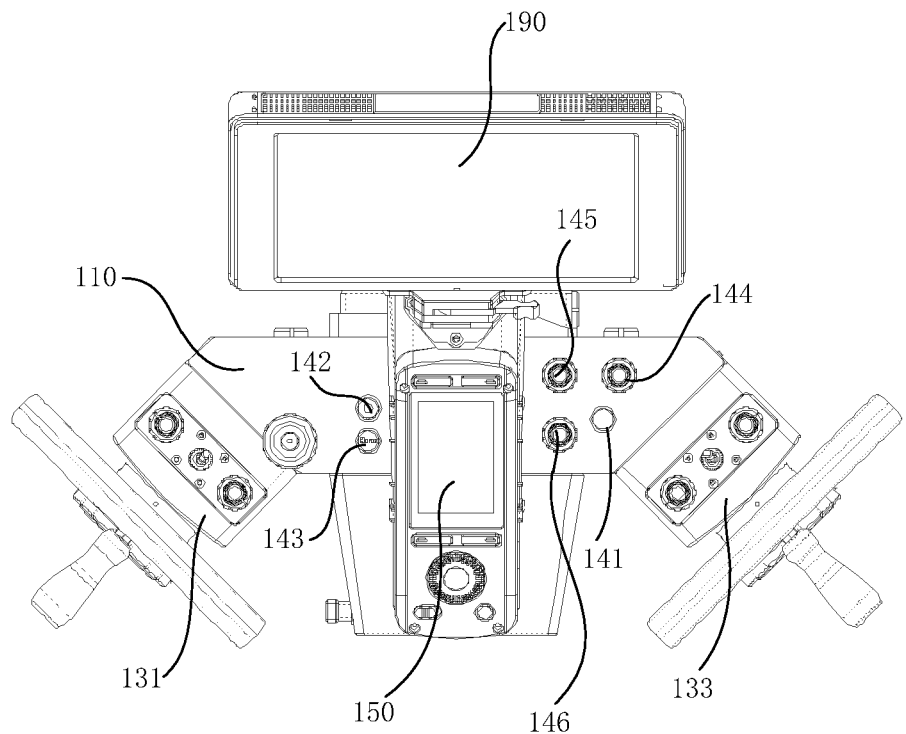
FIG. 6 illustrates a top view of FIG. 2.

FIG. 2 is a schematic structural diagram of a remote control according to some embodiment of the present disclosure. FIG. 3 illustrates a front view of FIG. 2; FIG. 4 illustrates a rear view of FIG. 2; FIG. 5 illustrates a right view of FIG. 2; and FIG. 6 illustrates a top view of FIG. 2.

As shown in FIGS. 2 to 6, the remote control 100 includes: a body 110 and a first wheel assembly 131. The first wheel assembly 131 includes a first wheel 1311. The first wheel 1311 can be rotated by a driving force to control a movement of at least one axle of the gimbal 200, thereby adjusting the altitude of the gimbal 200, so that the camera 300 mounted on the gimbal 200 obtains a suitable shooting angle and shooting direction.

Specifically, the first wheel 1311 may control at least one of: a Yaw axle, a Pitch axle, or a Roll axle of the gimbal 200, to correspondingly adjust a Yaw angle, a Pitch angle, or a Roll angle of the gimbal 200. During operation, by controlling the first wheel 1311 to rotate around its rotational axis, the body 110 senses or receives a rotation direction and rotation angle of the first wheel 1311, to generate control information for controlling at least one axle of the gimbal 200 to move, thereby changing the altitude of the gimbal 200. When the gimbal 200 receives the control information, it controls the at least one of: the Yaw motor, the Pitch motor, or the Roll motor on the gimbal 200 to rotate, and further cause at least one axle of the gimbal 200 to move, thereby adjusting at least one of: a Yaw angle, a Pitch angle, or a Roll angle of the gimbal 200. For example, when the first wheel 1311 is used to control the Yaw axis of the gimbal 200, if the first wheel 1311 rotates clockwise by 5 degrees, the Yaw motor rotation of the gimbal 200 may be controlled to drive the Yaw axle movement, so that the Yaw angle of the gimbal 200 also rotates by 5 degrees. For example, when the first wheel 1311 is used to control the movement of the Yaw axle and the Pitch axle of the gimbal 200, the Pitch motor rotation of the gimbal 200 may be controlled to drive the Pitch axle movement when the first wheel 1311 rotates clockwise, and the Yaw motor rotation of the gimbal 200 may be controlled to drive the Yaw axle movement when the first wheel 1311 rotates counterclockwise. Of course, the control of the Yaw axle and the Pitch axle by the first wheel 1311 can also be realized by setting a switch. For example, when the first wheel 1311 is used to control the Yaw axle, the Pitch axle, or the Roll axle movement of the gimbal 200, a switching button may be set to switch the axle of the gimbal 200 controlled by the first wheel 1311.

It should be noted that the body 110 of the remote control 100 can also directly transmit the rotation direction and rotation angle of the received or sensed first wheel 1311 to the controller 150 of the gimbal 200, and the controller 150 of the gimbal 200 is used to generate control information for controlling the rotation of the Yaw motor, the Pitch motor, or the Roll motor of the gimbal 200. Of course, in actual setting process of the remote control 100, the rotation angle or the rotation direction of the first wheel 1311 may also be used as a condition for controlling operating parameters of the gimbal 200.

In this embodiment, since axial movement of the gimbal 200 is realized by rotating the first wheel 1311, it does not have defects in the existing rocker-type remote control, such as the returning force applied to the rocker which makes it impossible to control a stop position of the rocker. Linear control of the gimbal 200 can be obtained, to improve the control precision of the remote control 100, and obtain stable and high-quality source materials. Moreover, the first wheel 1311 is used to adjust the altitude of the gimbal 200, so that the operation mode of controlling the shooting angle and the shooting direction of the camera 300 is also similar to the long-term shooting habit of the photographer, so that the photographer is not caused to feel uncomfortable with the operation mode, and the time for the photographer to adapt to the remote control 100 can be reduced, thereby improving the efficiency of shooting.

For simplicity of description, the structure of the first wheel assembly 131 will be described in detail below by taking the first wheel assembly 131 to control the Yaw angle of the gimbal 200 as an example, but it should be understood, that the following description is equally applicable to the control of Pitch axle and the Roll axle of the gimbal 200.

As shown in FIGS. 2 to 6, the first wheel assembly 131 is mounted on a left side of the body 110 to facilitate the photographer to use the left hand to rotate the first wheel 1311 to control the Yaw angle of the gimbal 200. Apparently, the first wheel assembly 131 can also be mounted at other suitable locations on the body 110 as needed. Further, a handle 1312 is optionally mounted on an outside (a left side as shown in FIG. 2) of the first wheel 1311, so that the photographer can better grip when turning the first wheel 1311. As such, the photographer can turn the first wheel 1311 by grasping the handle 1312, which is convenient and labor-saving. It can be understood that the handle 1312 may be omitted, and the first wheel 1311 is rotated by holding an outer contour of the first wheel 1311.

With continued reference to FIGS. 2 to 6, the first wheel 1311 is connected to the left side of the body 110 by a connecting portion 1313. Optionally, the connecting portion 1313 is a structure integrated with the first wheel 1311. For example, the connecting portion 1313 is a protrusion formed on an inner surface of the first wheel 1311. The axle passes through the axle hole in a center of the first wheel 1311 and a through hole in the protrusion fixed on a left side wall of the body 110. A cover which screwed to an end of a rotating axle is disposed on an outside the first wheel 1311, and a limitation of the cover can prevent the first wheel 1311 from falling off the rotating axle. Optionally, the connecting portion 1313 and the first wheel 1311 are separate structures, e.g., the connecting portion 1313 is a rectangular block. The rotating axle is fixed to the side wall of the connecting block through the axle hole in the center of the first wheel 1311, so that the first rotating wheel 1311 can rotate around the rotating axle to control the Yaw angle of the gimbal 200.

In some optional embodiments, the connecting portion 1313 disposed separately from the wheel is fixed to the body 110. For example, the connecting portion 1313 is fixed to a left side surface of the body 110 in a non-detachable manner such as welding or riveting; or, the connecting portion 1313 is detachably fixed to the left side surface of the body 110 by bolts, buckles, etc. Optionally, a plurality of mounting holes may be disposed on the body 110, and the connecting portion 1313 can be buckled in any one of the mounting holes, to adjust the position, angle, etc., of the first wheel assembly relative to the body.

Figure 7:
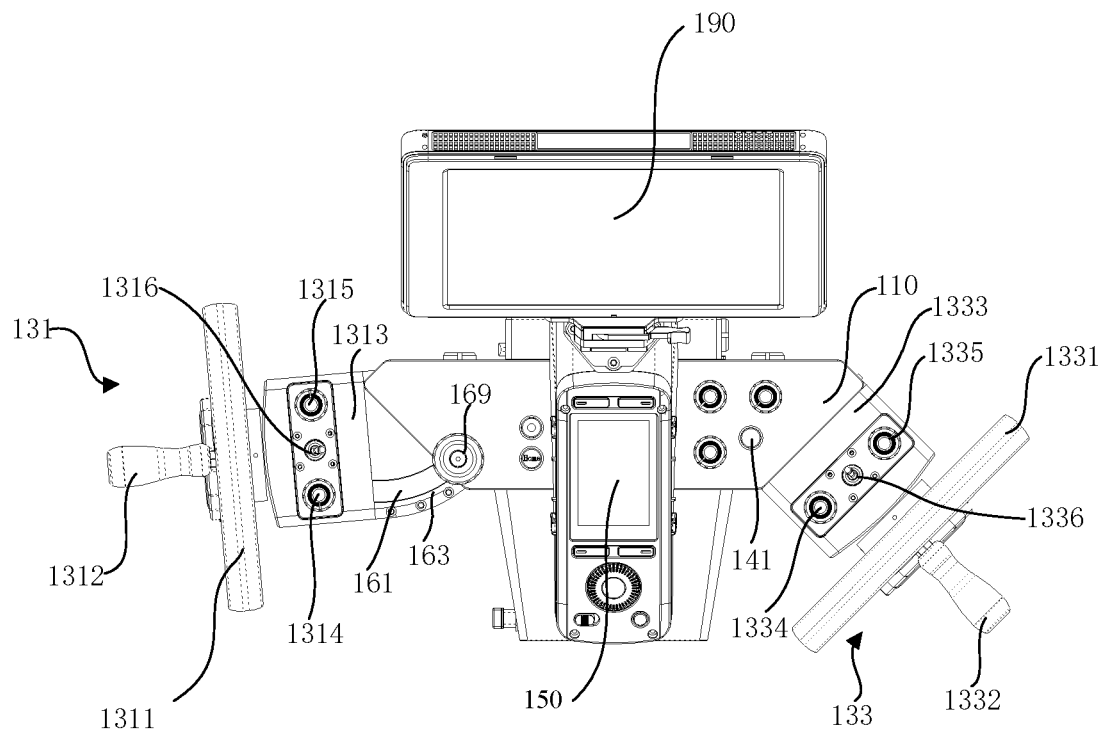
FIG. 7 illustrates a top view of a first wheel assembly in FIG. 2 after rotation.

In other optional embodiments, the connecting portion 1313 disposed separately from the first wheel 1311 and the body 110 are rotatably connected by a rotating axle 162, as shown in FIG. 7. FIG. 7 illustrates a top view of the first wheel assembly in FIG. 2 after rotation. The rotating axle 162 may be fixed to the body 110 or the connecting portion 1313, or the rotating axle 162 is located at a center of the hinge, and both ends of the hinge are fixed to the first wheel assembly 131 and the connecting portion 1313, respectively.

The remote control 100 of the present embodiment is connected to the first wheel assembly 131 and the body 110 by the rotating axle 162, so that a position or an angle relative to the body 110 of the first wheel assembly 131 can be adjusted by rotating the first wheel assembly 131 to obtain a suitable operation interval and operating angle, to facilitate the photographer to control the rotation of the first wheel 1311 or to operate a function button selectively mounted on the first wheel assembly 131, the body 110, or the both. Based on the foregoing description, for the remote control 100 provided in this embodiment, the position and angle between the remote control 100 and the body 110 can be adjusted by rotating the first wheel assembly 131, thereby facilitating the operation of the photographer, including but not limited to: adapting to different requirements of operating positions and angles, usage habits of different people, and adapting to application environments of certain special scenarios (e.g., narrow spaces).

It should be noted that in order to lock the first wheel assembly 131 and the body 110 to avoid displacement when the two are not required to rotate, the locking can be implemented by any locking method. For example, when the rotating axle 162 is mounted on the body 110, the locking between the first wheel assembly 131 and the rotating axle 162 can be achieved by appropriately setting a static friction between the first wheel assembly 131 and the rotating axle 162. When the rotating axle 162 is mounted on the first wheel assembly 131, the locking can be achieved by properly setting the static friction between the body 110 and the rotating axle 162.

Optionally, the remote control 100 is provided with a locking mechanism for locking or relaxing the body 110 and the first wheel assembly 131, the locking mechanism comprising a locking member. The locking member can be implemented in a variety of configurations. In this embodiment, the locking member is a screw 167, and the screw 167 passes through a threaded hole disposed in the body 110 or the first wheel assembly 131, to abut on the first wheel assembly 131 or the body. Accordingly, the body 110 and the first wheel assembly 131 can be locked by tightening the screw 167. In addition, the locking member may also be a buckle, and a movable portion and a fixed portion of the buckle are respectively mounted on the first wheel assembly 131 and the body 110, and vice versa, to implement the locking of the first wheel assembly 131 and the body 110. In another example, the locking member is a wedge. When the first rocker assembly 131 is rotated to a desired angle, the wedge is inserted between the first wheel assembly 131 and the body 110, to implement the locking of the body 110 and the first wheel assembly 131. In another example, the locking member is a pin, and a plurality of pin holes are disposed in the body 110 or the first wheel assembly 131, so that the pin can be inserted into the pin hole after the first wheel assembly 131 is rotated to a proper angle, to implement the locking of the first wheel assembly 131 and the body 110.

Figure 8:
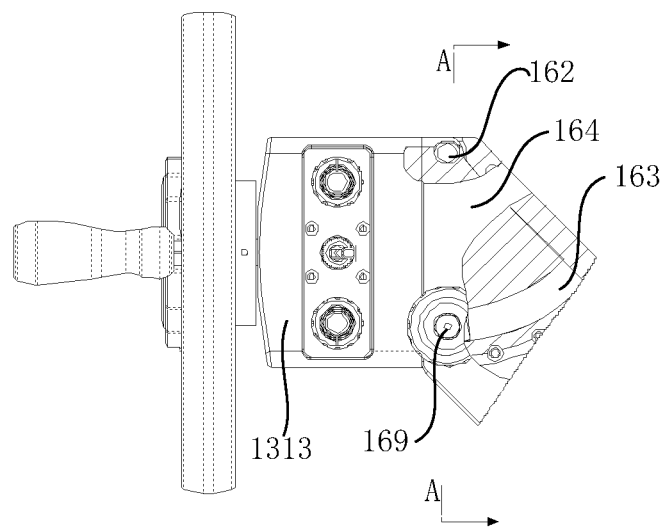
FIG. 8 illustrates a local cross-sectional diagram of a top view of the first wheel assembly in FIG. 7.
Figure 9:
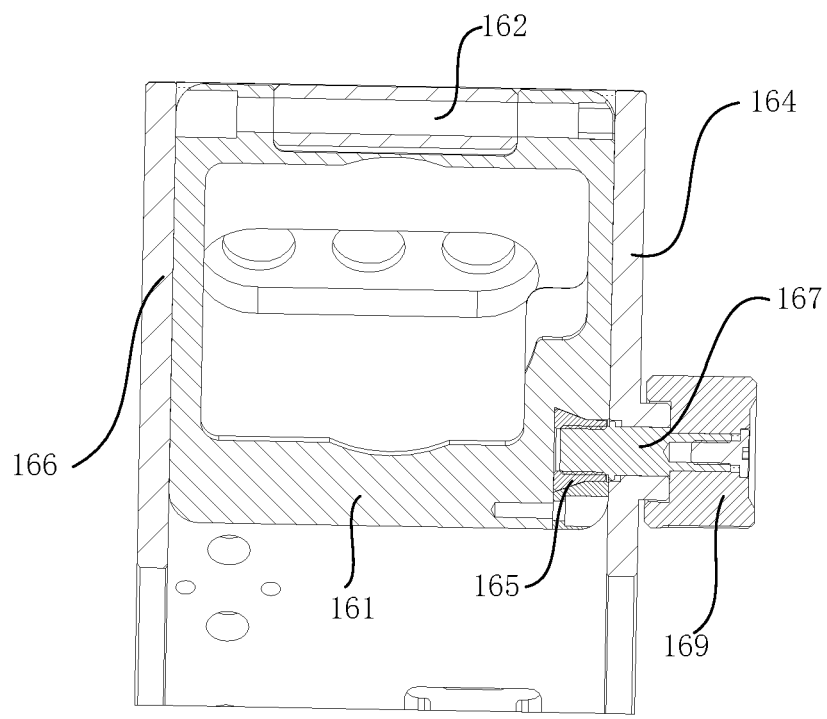
FIG. 9 illustrates a cross-sectional diagram of FIG. 8 along a direction A-A.
Figure 10:
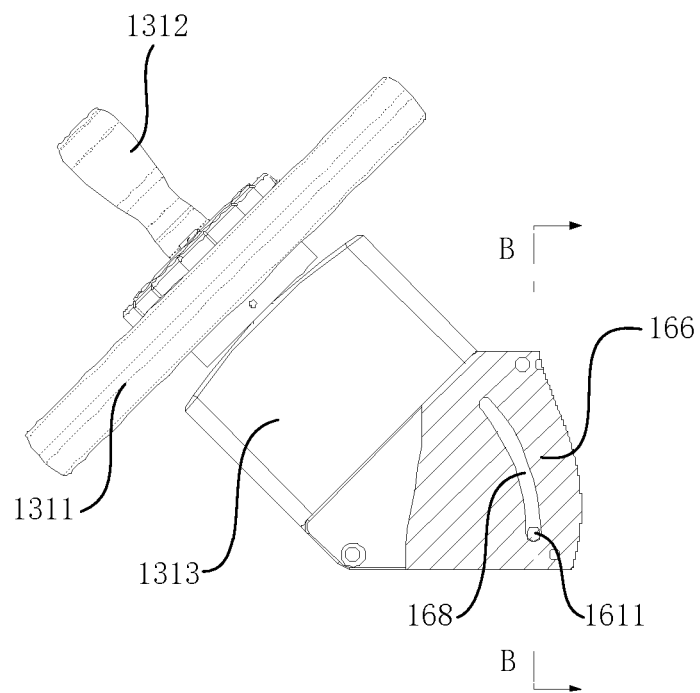
FIG. 10 illustrates a local cross-sectional diagram of a bottom view of the first wheel assembly in FIG. 7.
Figure 11:
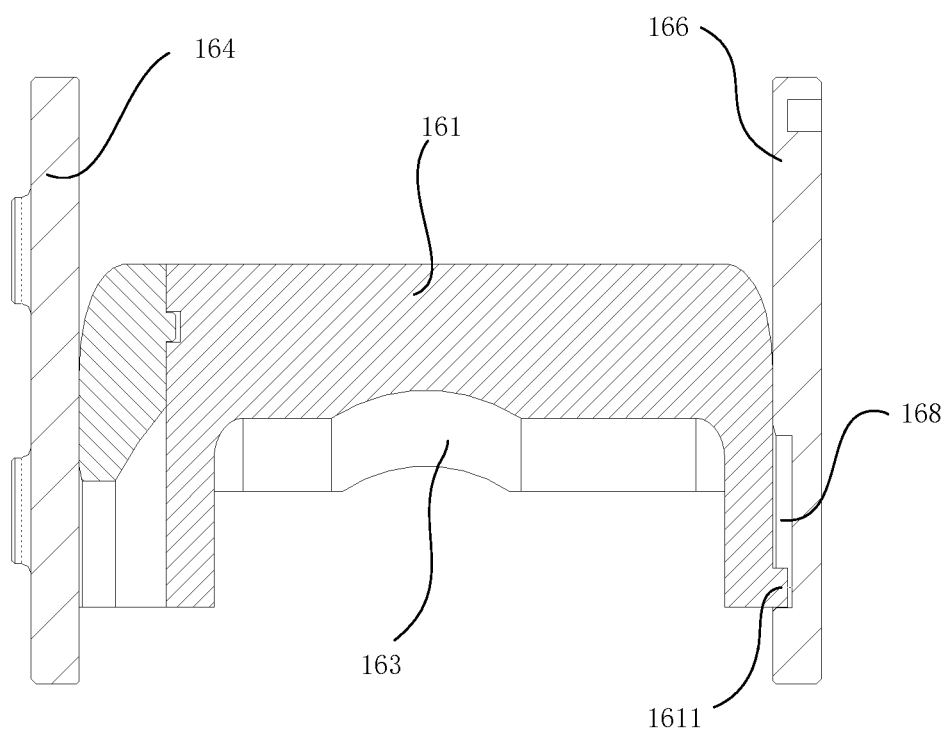
FIG. 11 illustrates a cross-sectional view of FIG. 10 along a direction B-B.

FIG. 8 is a partial cross-sectional diagram of a top view of the first wheel assembly in FIG. 7; FIG. 9 illustrates a cross-sectional diagram of FIG. 8 along a direction A-A; FIG. 10 illustrates a local cross-sectional diagram of a bottom view of the first wheel assembly in FIG. 7; and FIG. 11 illustrates a cross-sectional view of FIG. 10 along a direction B-B.

As shown in FIG. 7 to FIG. 10, optionally, in order to facilitate a relative rotation between the first wheel assembly 131 and the body 110, a guiding mechanism is further disposed between the body 110 and the connecting portion 1313. The guiding mechanism includes a guiding groove 163 disposed on the first wheel assembly 131, and a slider slidably disposed in the guiding groove 163 and connected to the body. For example, a guiding member 161 is disposed on an inner side of the connecting portion 1313, and a guiding groove 163 is disposed in the guiding member 161. Correspondingly, a slider capable of sliding in the guiding groove 163 is disposed in the guiding groove 163, and the slider can be connected to the body 110 by a rod or other structural form. Accordingly, when the first wheel assembly 131 is driven to rotate around the rotation axle 162, the slider can slide in the guiding groove 163 to achieve the guiding action. In this embodiment, the slider is connected to the body 110 by a locking member 167. For another example, the guiding member 161 is mounted on the left side wall of the body 110, and the slider slidably disposed in the guiding groove 163 is fixed at a suitable position of the connecting portion 1313. Further, instead of the above slider, a slider connected to the first wheel assembly 131 may be directly disposed in the guiding groove 163. In the present embodiment, the above-mentioned guiding member 161 includes but not limited to: a plate-like structure, a block-like structure, and a frame structure.

A shape of the guiding groove 163 is not specifically limited, and those skilled in the art can design according to actual needs. For example, the guiding groove 163 is an arcuate groove centered on the rotation axle, to match a movement trajectory of the first wheel assembly 131 with respect to the body 110. Along a depth direction of the guiding groove 163 can be designed as a dovetail groove as shown in FIG. 9. When the cross section of the guiding groove 163 is designed as a dovetail groove, the slider can be correspondingly designed as a trapezoidal slider 165 that matches the dovetail groove, so that the locking or release of the first wheel assembly 131 can be implemented by changing a size of a gap between the trapezoidal slider 165 and the dovetail groove.

Further, in order to adjust the gap between the trapezoidal slider 165 and the dovetail slot to lock the body 110 and the first wheel assembly 131, the locking member may be provided as a screw 167, and a connecting end between the trapezoidal slider 165 and the screw 167 may be fixed. The following is an example in which the guiding groove 163 is disposed on the first wheel assembly, and matched relationships of the screw 167 with the body 110 and the trapezoidal slider 165 are introduced. Of course, the following matched relationships can also be applied directly or after simple replacement to the guiding groove 163 disposed in a remote control on the body 110.

An external thread is disposed on the screw 167, and a free end of the screw 167 is disposed in the through hole of the body 110 with a matching internal thread. As such, by rotating the screw 167, the trapezoidal slider 165 can be pushed to move in an axial direction of the screw 167, thereby implementing an adjustment of the matching gap between the trapezoidal slider 165 and the dovetail groove, to further lock the first wheel assembly 131 to the body 110. Optionally, to facilitate a rotation of the screw 167, the locking member further includes a locking knob 169 mounted to the free end of the screw 167. During assembly, the locking knob 169 can be fixed to the free end of the screw 167 by screw. When it is required to lock or release the first wheel assembly 131, only the locking knob 169 installed at the free end of the rotating screw 167 needs to be turned to drive the screw 167 to move axially, thereby driving the trapezoidal slider 165 to also move along the axial direction of the screw 167. Accordingly, the matching gap between the trapezoidal slider 165 and the dovetail slot can be adjusted to achieve the purpose of locking or releasing the first wheel assembly 131 and the body 110. Optionally, a boss may be formed in the through hole to facilitate the movement of the locking knob 169.

Optionally, the body 110 further includes a fixing member 164, and the free end of the screw 167 passes through a through hole formed in the fixing member 164. For example, the body 110 includes a fixing member 164 disposed on the left side, and at this time, the rotating axle 162 may be mounted on the fixing member 164. An axle hole is vertically disposed in the connecting portion 1313 (e.g., an upper right corner), and the rotating axle 162 is disposed in the axle hole, thereby realizing a rotatable connection between the first wheel assembly 131 and the body 110. As an alternative, the rotating axle 162 can also be mounted on the connecting portion 1313, and a sleeve may be mounted on the fixing member 164, the sleeve being sleeved on the rotating axle 162 to realize the rotatable connection between the first wheel assembly 131 and the body 110. Similarly, the fixing member 164 can also be mounted on the first wheel assembly 131, and the free end of the screw 167 extends through the through hole formed in the fixed member to an outside of the first wheel assembly 131.

The specific structure of the fixing member 164 is not specifically limited to this embodiment, and those skilled in the art can select any suitable structure as the fixed member. For example, the fixing member 164 may be two fixing plates disposed at a distance on the body 110, and the guiding member 161 of the first wheel assembly 131 is disposed between the two fixing plates, or when the first wheel assembly 131 rotates relative to the body 110, at least a portion of its guiding member 161 can be exposed between the two fixing plates. Apparently, the first wheel assembly 131 may also include two guiding plates spaced apart. Accordingly, the body 110 includes a fixed member which may be disposed between the two guiding plates of the first wheel assembly 131.

Optionally, as shown in FIG. 10 and FIG. 11, another limiting mechanism is further disposed between the body 110 and the connecting portion 1313, configured to limit the angular range of the first wheel assembly 131 relative to the body 110. In some optional embodiments, the limiting mechanism is a flexible member, such as a cord or chain, that is connected to the body and the first wheel assembly at each end. In other optional embodiments, the limiting mechanism includes: a positioning groove and a positioning post inserted in the positioning groove. For example, the positioning groove is disposed on the body 110, and the positioning post is disposed on the first wheel assembly 131, and vice versa. Specifically, a positioning plate 166 may be disposed on the body 110, e.g., the positioning plate 166 is disposed on the left side wall of the body. Further, the positioning plate 166 and the above two fixing plates may be disposed in parallel, or one of the fixing plates may be directly used as the positioning plate. Still further, for the convenience of operation, the positioning plate 166 may be disposed below the fixing plate, or the fixing plate located below may be used as the positioning plate. A positioning grove 168 is disposed on the positioning plate 166, configured to limit a maximum rotation angle and a minimum rotation angle of the first wheel assembly 131. A positioning post 1611 is disposed on a surface of the guiding member 161 facing the positioning plate 166, and the positioning post 1611 is inserted into the positioning groove 168. In the actual design process, a shape, position or length of the positioning groove 168 can be set as needed to obtain a range of rotatable angles for different sizes of the first wheel assembly 131. By providing the limit mechanism, the first wheel assembly 131 can move between the maximum rotation angle and the minimum rotation angle, thereby facilitating a use of the remote control 100 by different photographers.

Further, as shown in FIG. 2 to FIG. 6, one or more of the following are disposed on the connecting portion 1313: a rotation speed control knob 1314 configured for controlling the Yaw axle of the gimbal 200, adjustment knob 1315 configured for controlling a response speed of the Yaw axle of the gimbal 200, an on/off switch configured for activating or deactivating the first wheel assembly 131 or the first wheel 1311, and a switch 1316 configured for switching left or right hand operation. In the present embodiment, specific setting positions of the rotation speed control knob 1314, the adjustment knob 1315, the on/off switch and the switch 1316 are not limited, and those skilled in the art can select an appropriate position according to actual needs for design. For example, the above-described rotation speed control knob 1314, the adjustment knob 1315, the on/off switch, and switch 1316 may be disposed on a top surface of the connecting portion 1313 for the photographer to use. Further, in a specific setting, the on/off switch and the switch 1316 may be disposed between the rotation speed control knob 1314 and the adjustment knob 1315. Optionally, the on/off switch and the switch 1316 may be integrated during a specific design process to reduce the number of switches. For example, as shown in FIG. 2, the on/off switch and the switch 1316 can be integrated into one lever switch. During operation, the first wheel assembly 131 or the first wheel 1311 is deactivated when the lever is turned to a middle; the first wheel assembly 131 or the first wheel 1311 is activated when the lever is turned to the left, and the photographer uses his/her left hand to manipulate the first wheel 1311; when the lever is turned to the right, the first wheel assembly 131 or the first wheel 1311 is activated, and the photographer uses his/her right hand to manipulate the first wheel 1311. Of course, other suitable integrated switches can also be selected to implement the functions of the on/off switch and the switch 1316.

In the embodiment, the adjustment knob 1315 is specifically configured to adjust the response speed when the gimbal is activated; the switch 1316 is specifically configured to switch the left/right hand operation between the remote control 100 and the gimbal to facilitate user switching due to different usage habits. The speed control knob 1314 is specifically configured to control a correspondence relationship between a control amount of the controller 100 and an amount of the gimbal rotation.

Further, in order to visually display the rotation angle of the first wheel 1311, an angle identification disc may be optionally fixed on the rotation axle or the connecting portion 1313, and a pointer is fixed on the first wheel 1311. Thus, when the first wheel 1311 rotates around the rotational axis, the pointer fixed on the first wheel 1311 also rotates with the first wheel 1311, so that the rotation angle of the first wheel 1311 can be directly read out through the angle identification disc. Of course, the Yaw angle of the gimbal 200 may be correspondingly identified on the angle indicator disc when the first wheel 1311 rotates by a certain angle. For example, when the first wheel 1311 rotates by 30 degrees, the Yaw angle of the gimbal 200 changes by 1 degree.

With continued reference to FIGS. 2-7, the remote control 100 also optionally includes a second wheel assembly 133. The second wheel assembly 133 includes a second wheel 1331 capable of controlling at least one axle movement of the gimbal 200. The first wheel assembly 131 and the second wheel assembly 133 may be integrated together, or may be spaced apart from an outer edge of the body 110, for example, the first wheel assembly 131 is disposed on the left side of the body 110, and second wheel assembly 133 is disposed on the right side of the body 110 opposite to the first wheel assembly 131. By disposing the second wheel assembly 133, the movement of at least two axles of the gimbal 200 is controlled by the first wheel 1311 and the second wheel 1331, so that the control of the plurality of axles of the gimbal 200 can be realized, to improve the altitude adjustment efficiency of the gimbal 200.

In general, the second wheel 1331 and the first wheel 1311 are arranged to control different axles of the gimbal 200, but this embodiment does not exclude that the second wheel 1331 and the first wheel 1311 control the same axle of the gimbal 200. For example, when the first wheel 1311 is configured to control the movement of the Yaw axle of the gimbal 200 to adjust the Yaw angle of the gimbal 200, and the second wheel assembly 133 is configured to control the movement of the Pitch axle of the gimbal 200 to adjust the Pitch angle or the Roll angle of the gimbal 200, and vice versa. The second wheel assembly 133 is described below by taking the first wheel assembly 131 controlling the movement of the Yaw axle and the second wheel assembly 133 controlling the movement of the Pitch axle as an example.

A handle 1332 may also be disposed on the second wheel 1331 of the second wheel assembly 133. Similarly, a connecting portion 1333 may also be disposed on the second wheel assembly 133, and optionally, one or more of the following may be disposed on the connecting portion 1333: a rotation speed control knob 1334 configured for controlling the Pitch axle of the gimbal 200, an adjustment knob 1335 configured for controlling the response speed of the Pitch axle of the gimbal 200, an on/off switch configured for activating or deactivating the second wheel assembly 133 or the second wheel 1331, and a switch 1336 for switching the left/right hand operation.

Further, the connection between the second wheel assembly 133 and the body 110 may be a fixed connection or a rotational connection. For example, the first wheel assembly 131 and the second wheel assembly 133 are both connected to the body 110, and such a connection may be detachable or undetachable. For another example, the first wheel assembly 131 is rotatably connected to the body 110 via the rotation axle 162, and the second wheel assembly 133 is connected to the body 110, and vice versa. Thus, a distance between the first wheel assembly 131 and the second wheel assembly 133 can be adjusted by rotating the first wheel assembly 131 or the second wheel assembly 133 that rotates with the body 110, thereby facilitating the operation of the remote control 100 by different photographers.

Figure 12:
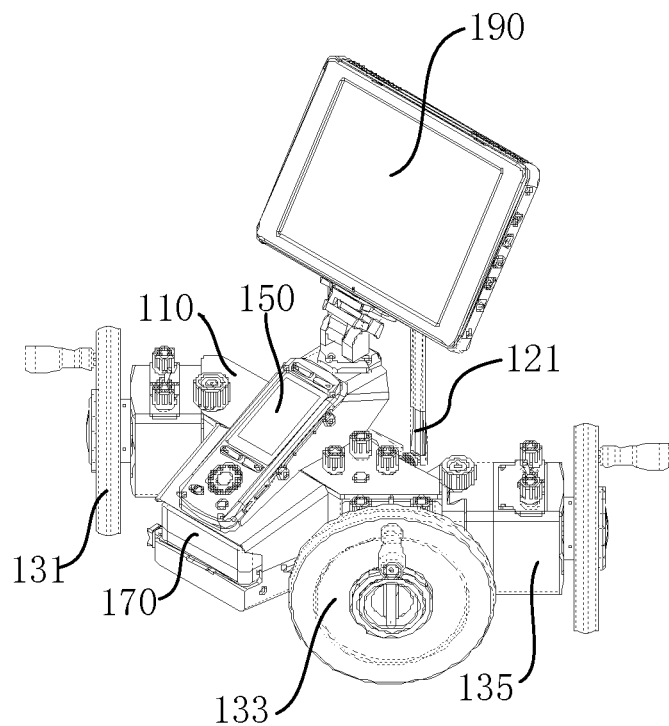
FIG. 12 is a schematic structural diagram of another remote control according to some embodiment of the present disclosure.
Figure 13:
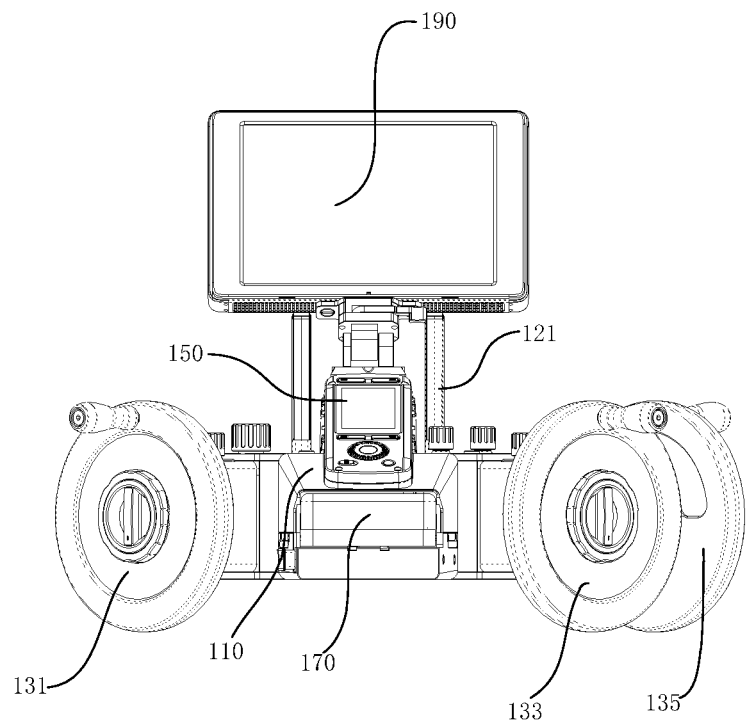
FIG. 13 illustrates a front view of FIG. 12.
Figure 14:
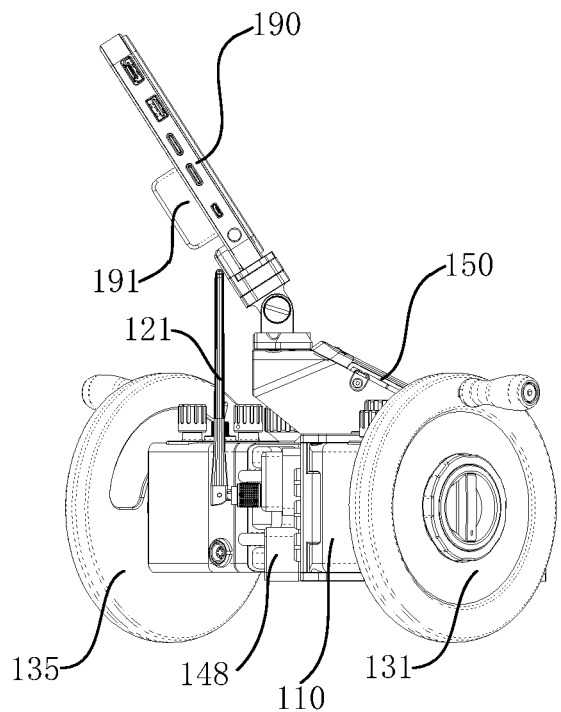
FIG. 14 illustrates a left view of FIG. 12.
Figure 15:
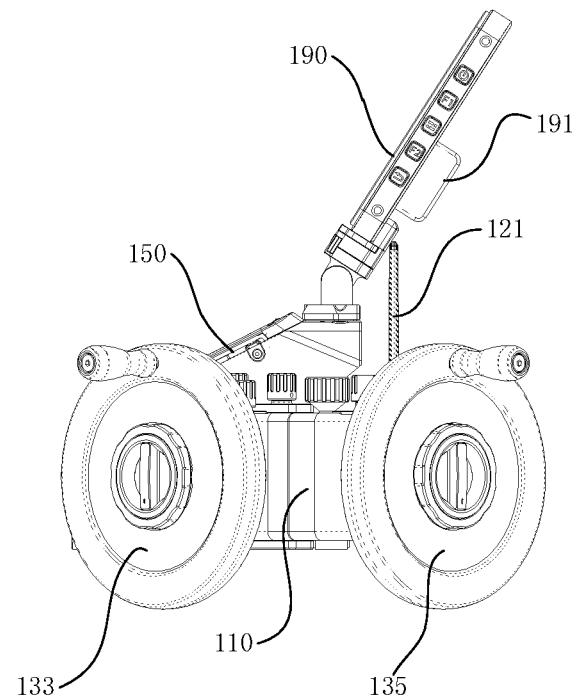
FIG. 15 illustrates a right view of FIG. 12.
Figure 16:
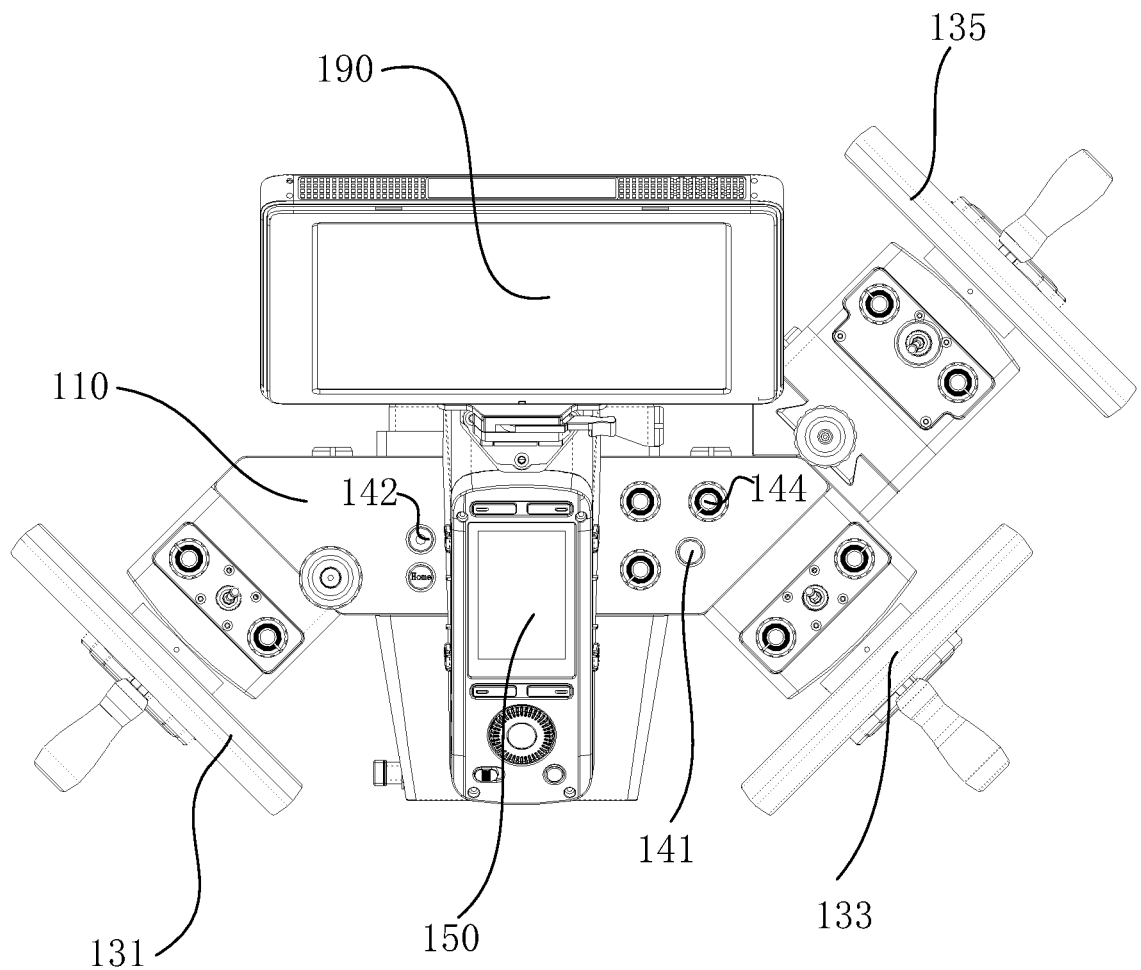
FIG. 16 illustrates a top view of FIG. 12.
Figure 17:
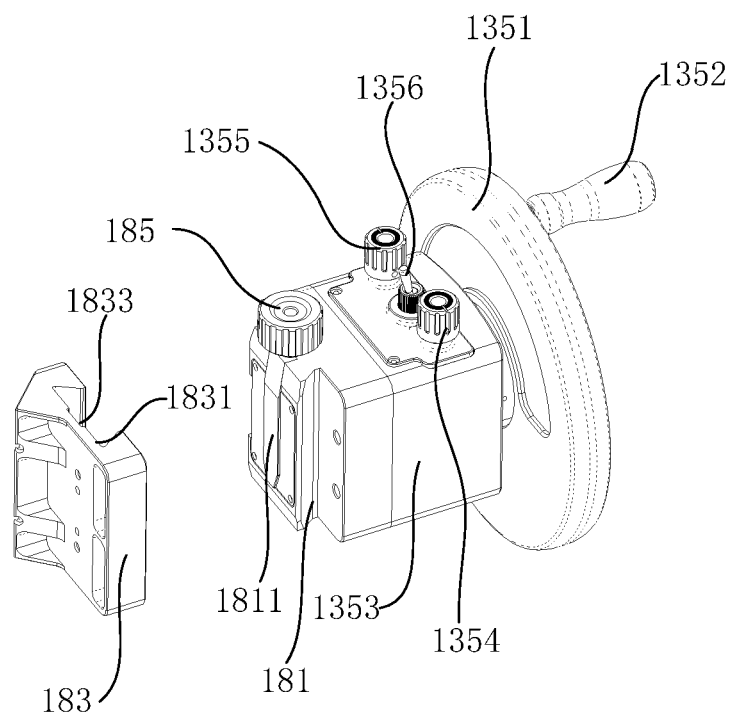
FIG. 17 illustrates an exploded diagram of a third wheel assembly in FIG. 12.

FIG. 12 is a schematic structural view of another remote controller consistent with this embodiment; FIG. 13 illustrates a front view of FIG. 12; FIG. 14 illustrates a left view of FIG. 12; FIG. 15 illustrates a right view of FIG. 12; FIG. 16 illustrates a top view of FIG. 12; and FIG. 17 is an exploded view of a third wheel assembly in FIG. 12.

As shown in FIGS. 12 to 17, the remote control 100 of the present embodiment further includes a third wheel assembly 135 mounted on the body 110, the third wheel assembly 135 including a rotatable third wheel 1351. At least one axle movement of the gimbal 200 may also be controlled by driving the third wheel 1351 to rotate. In actual configuration, the first wheel 1311, the second wheel 1331 and the third wheel 1351 may be respectively configured to control one axle movement of the gimbal 200. For example, the first wheel 1311 is configured to control the Yaw axle movement of the gimbal 200 to adjust the Yaw angle of the gimbal 200, the second wheel 1331 is configured to control the Pitch axle movement of the gimbal 200 to adjust the Pitch angle, and the third wheel 1351 is configured to control the Roll axle of the gimbal 200 to adjust the Roll angle of the gimbal 200. Other structures of the third wheel assembly 135 will be described below by taking the above configurations as an example.

A handle 1352 may also be disposed on the third wheel 1351 of the third wheel assembly 135. Likewise, a connecting portion 1353 may also be disposed on the third wheel assembly 135, and optionally, one or more of the following can be disposed on the connecting portion 1353: a rotational speed control knob 1354 configured for controlling the Roll axle of the gimbal 200, an adjustment knob 1355 configured for controlling the response speed of the Roll axle of the gimbal 200, an on/off switch configured for activating or deactivating the third wheel assembly 135 or the third wheel 1351, and a switch 1356 configured for switching the left/right hand operation.

Further, the connection between the third wheel assembly 135 and the body 110 may also be a fixed connection or a rotational connection. For example, the first wheel assembly 131, the second wheel assembly 133, and the third wheel assembly 135 are all connected to the body 110. Of course, the fixed connection may be detachable or undetachable. For another example, the first wheel assembly 131 is rotatably connected to the body 110 via a rotation axle 162, the second wheel assembly 133 is connected to the body 110, and the wheel rocker assembly 135 is detachably connected to the body 110. Optionally, the third wheel assembly 135 is detachably connected to the body 110 by a quick detachable structure, so that the third wheel assembly 135 can be quickly installed or the third wheel assembly 135 can be dismantled from the body 110 as needed, to achieve the purpose of quickly expanding functions of the remote control 100.

Referring to FIG. 12 to FIG. 17, in some optional embodiments, the quick detachable structure includes: a tongue of tongue-and-groove connection 181 formed on the connecting portion, and a groove of a tongue-and-groove connection 1831 formed in the body 110 for coupling the tongue of tongue-and-groove connection 181, In some optional embodiments, the groove 1831 can be designed as a dovetail groove. The groove 1831 may be directly disposed in the side wall of the body 110, or a connection block 183 fixed on the side wall of the body 110 may be separately disposed as shown in FIG. 17, and then the groove 1831 is disposed in the connection block 183. Optionally, a limiting groove 1833 is defined in an inner wall of the groove 1831. One end of the limiting groove 1833 is closed. A flange 1811 locked in the limiting groove 1833 is formed on the tongue of tongue-and-groove connection 181. For example, as shown in FIG. 17, the limit groove 1833 having a top end opened and a lower end closed is formed in a bottom wall of the groove 1831. By a limitation of the flange 1811 and the limiting groove 1833, an additional compressive force can be applied to the quick detachable structure, to prevent the tongue of tongue-and-groove connection 181 and the groove 1831 from detachment due to insufficient compressive force. Still optionally, a locking knob 185 is disposed at an end of the flange 1811 corresponding to an open end position of the limiting slot 1833. For example, in FIG. 17, a locking knob 185 is disposed at an upper end of the flange 1811. During assembly, a bottom end of the tongue of tongue-and-groove connection 181 is inserted from an upper end of the groove 1831, and a bottom end of the flange 1811 is aligned with the open end of the limiting groove 1833 so that the tongue of tongue-and-groove connection 181 is inserted into the groove 1831 from top to bottom, and then the locking knob 185 is rotated to reduce the gap between a bottom of the knob and a top of the connecting block 183. Since the side wall of the locking knob 185 exceeds the limiting slot 1833, and accordingly, the connecting block 183 and the third wheel assembly 135 can be locked after the locking knob 185 is tightened.

In other optional embodiments, the quick detachable structure includes a tongue of tongue-and-groove connection 181 disposed in the body 110 and a groove of a tongue-and-groove connection 1831 configured for coupling the tongue of tongue-and-groove connection 181 formed in the connection portion of the third wheel assembly 135. In addition, a partial structure of the tongue of tongue-and-groove connection 181 and the groove 1831 may be the same as the partial structure described in the previous paragraph, and details are not described herein again.

It can be understood that the first wheel assembly 131 and the second wheel assembly 133 can also be connected to the body 110 by using the quick detachable structure described above.

Further, the remote control 100 optionally further includes a focus wheel, the focus wheel including a focus wheel configured for controlling a focus follower of the gimbal 200 to adjust the physical aperture on the camera 300. Of course, the remote control 100 can also include more wheels, and those skilled in the art can set an appropriate number of wheels and function of each wheel as needed.

It can be understood that spatial relationships among the first wheel assembly 131, the second wheel assembly 133, the third wheel assembly 135 and the focus wheel with the body 110 are not limited to the above and those presented in the drawings.

As shown in FIGS. 2 to 16, a wireless communication device 120 is mounted on the body 110 such that the gimbal 200 can establish a communication connection with the body 110 through the wireless communication device 120, thereby receiving control information transmitted from the body 110. The wireless communication device 120 can be any suitable wireless communication device 120, such as a Wi-Fi module, a Bluetooth module, etc. When the wireless communication device 120 is specifically assembled, the wireless communication device 120 can be directly assembled into the body 110 to form an integrated structure with the body 110. Of course, the wireless communication device 120 can also be connected to the body 110 through an interface or a connection line, to facilitate a wireless receiving capacity of the remote control 100 in certain scenarios. For example, in some optional embodiments, the wireless communication device 120 is detachably connected to a rear side of the body 110, such that it is not affected by the wireless communication device 120 when the photographer manipulates the wheel. When it is necessary to remotely control the gimbal 200 in a vehicle, the wireless communication device 120 can be detached from the body 110 and then placed on a car roof to improve the capacity of the remote control 100 to receive signals.

Figure 18:
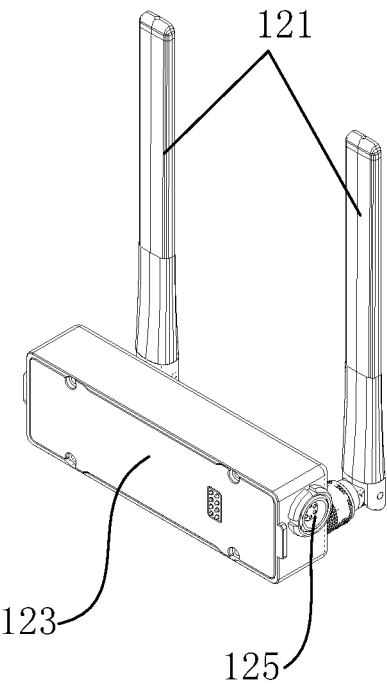
FIG. 18 is a schematic structural diagram of a wireless communication apparatus according to some embodiment of the present disclosure.
Figure 19:
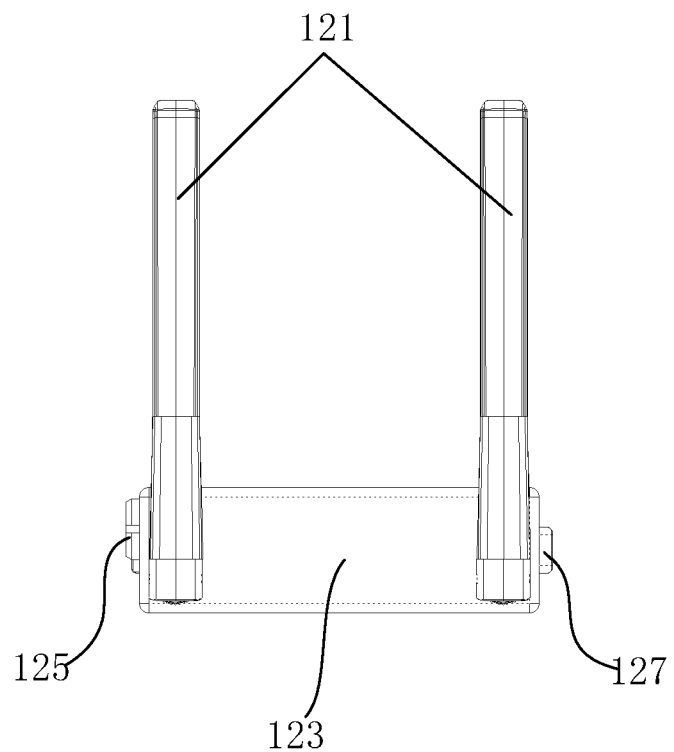
FIG. 19 illustrates a front view of FIG. 18.
Figure 20:
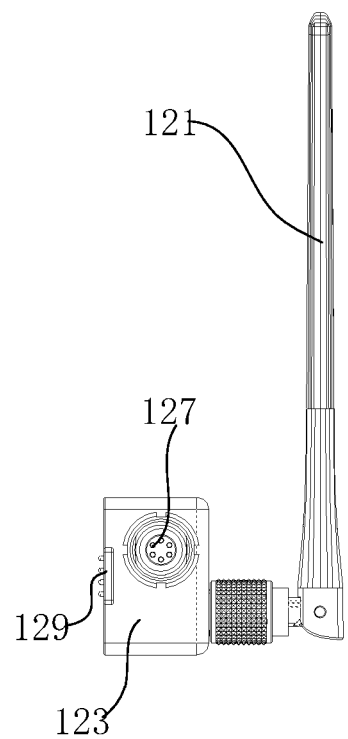
FIG. 20 illustrates a right view of FIG. 18.
Figure 21:
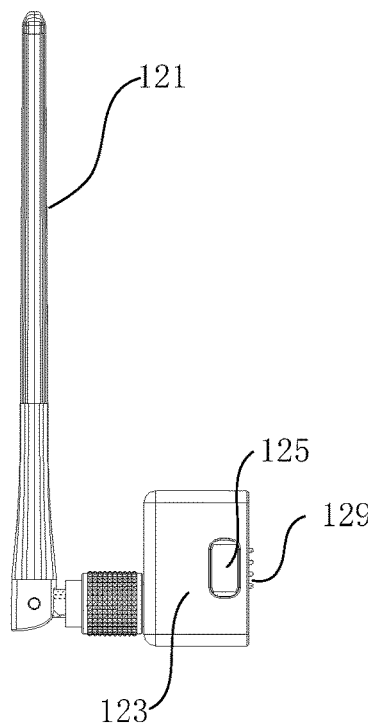
FIG. 21 illustrates a left view of FIG. 18.
Figure 22:
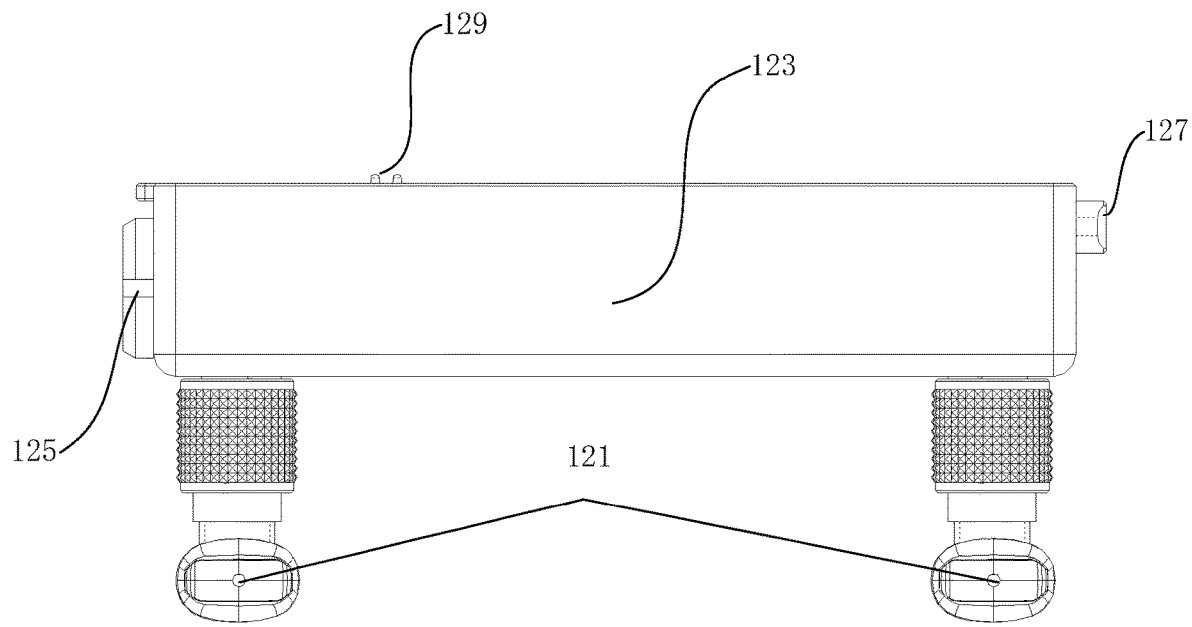
FIG. 22 illustrates a top view of FIG. 18.

FIGS. 18 to 22 show a quick detachable wireless communication device 120. FIG. 18 is a schematic structural diagram of an antenna 121 assembly; FIG. 19 illustrates a front view of FIG. 18; FIG. 20 illustrates a right view of FIG. 18; FIG. 21 illustrates a left view of FIG. 18; and FIG. 22 illustrates a top view of FIG. 18.

Referring to FIGS. 18 to 22, the wireless communication device 120 includes: a main body 123 and an antenna 121 mounted on the main body 123. A plug or a socket may be disposed on the main body 123, and a matched socket or plug may be disposed on the body 110, so that the wireless communication device 120 can be quickly mounted to the body 110 or quickly detached from the body 110. Optionally, as shown in FIG. 20, a pin plug 129 is disposed on the main body 123. Further, the outer periphery of the pin plug 129 is designed with a protrusion, and a guiding groove is formed on an inner wall of the socket of the body 110 to facilitate the correct installation of the plug and the socket. Further, a sealing structure is disposed in the plug and the socket, for example, a sealing groove is formed at a bottom of the socket, and a sealing edge disposed in the sealing groove is designed to be at an end of the plug; or, a plug or a socket is sleeved with a sealing ring. In addition, an interface 125 is optionally disposed on the main body 123 so that when the wireless communication device 120 is detached from the body 110, it can be connected to the body 110 by inserting a connection line at the interface 125. Optionally, some function knobs 127 for controlling wireless communication functions may also be disposed on the main body 123.

With continued reference to FIG. 2, FIG. 7, and FIG. 12, the shape of the body 110 can be selected according to specific needs. For example, a rectangular box or a cubic box can be selected as the body 110. For example, an irregularly shaped box structure as shown in FIG. 12 may be selected as the body 110, to mount three or more wheels. It can be understood that an electronic device, such as a circuit board or a sensor, may be installed in the body 110, and details are not described herein. Those skilled in the art can set the type and connection mode of the electronic device in the body 110 according to actual needs.

Optionally, a battery 170 is installed on the body 110. For example, when the first wheel assembly 131 and the second wheel assembly 133 are respectively disposed on the left and right sides of the body 110, the battery 170 may be installed on a front side of the body 110. In some optional embodiments, a container box can be placed on the body 110 and then the battery 170 can be installed in the container box. A specific structure and arrangement of the container box can be designed according to actual needs, and is not specifically limited herein. For example, a container box may be concavely formed by a front side wall of the body 110; and, for example, the container box may be a separate part from the body 110, which is fixed to the body 110. Further, the battery 170 is installed in the container box by an elastic mechanism, and by applying an elastic action of the elastic mechanism, when a driving force is applied to the battery 70, the battery 170 can be ejected from the container box or be locked in the container box. For example, the elastic mechanism is a spring that is mounted in a movement direction of the battery 170. When the battery 170 needs to be installed, a compression spring of the battery 170 is compressed to fully push the battery 170 into the container box, and is blocked by a limiting wall disposed at an opening of the container box to prevent the battery 170 from falling out; when the battery 170 needs to be taken out, the compression spring of the battery 170 is pulled so that the compression spring 170 disengages the battery 170 from the limiting wall, to cause the battery 170 to move in a direction perpendicular to the spring, and accordingly, the battery 170 can be ejected from the container box by the elastic force of the spring.

As shown in FIGS. 2 to 12, a controller 150, such as a GCU controller, is optionally mounted on the body 110 to facilitate the photographer to set or modify the parameters of the gimbal 200. For example, the photographer may input a corresponding relationship in the controller 150 between each wheel and the Yaw axle, the Pitch axle, and the Roll axle of the gimbal 200, that is, input in the controller 150 which one or more of the Yaw axle, the Pitch axle, and the Roll axle of the gimbal 200 are correspondingly controlled by first wheel assembly 131. Of course, this corresponding relationship can also be preset by the manufacturer or the seller. For another example, the photographer can input, in the controller 150, how many degrees of rotation of a certain corresponding axle of the gimbal 200 when the first wheel 1311 rotates one lap. In designing, the controller 150 can be disposed at any suitable position of the body 110. For example, the controller 150 can be disposed between the first wheel assembly 131 and the second wheel assembly 133, and for example, as shown in FIG. 2, the controller 150 can be disposed on a top surface of the body 110 to facilitate the photographer to input corresponding control parameters. In some optional embodiments, the controller 150 is detachably mounted on the body 110 to facilitate replacing the controller 150. Further, the controller 150 may include a display screen.

One or more of: a power switch 141, a video switch 142, a photo switch, a focus button 144, a focus adjustment knob 145, an aperture adjustment knob 146, a home button 143, an output interface 147, and an expansion interface 148, may be disposed on the body 110. In general, the above structure may be disposed at any suitable position of the body 110. For example, as shown in FIGS. 6 to 16, the output interface 147 and the expansion interface 147 may be disposed on the rear side of the body 110 to facilitate a connection with other external parts. The device and other components may be disposed on the top surface of the body 110 to facilitate the operation of the photographer. In an optional embodiment, the controller 150 can be disposed on a longitudinal axis of the body 110, the camera switch 142 and the home button 143 are disposed on a left side of the controller 150, the power switch 141, the focus button 144 are disposed, the focus adjustment knob 145 and the aperture adjustment knob 146 are disposed on a right side of the controller 150. It should be understood that the aperture adjustment knob 146 disposed on the body 110 may be configured to adjust one or more of the electronic aperture and the physical aperture of the camera 300, but when the above-mentioned focus wheel is disposed on the remote control 1001, the aperture adjustment knob 146 may only be configured to adjust the electronic aperture of the camera.

Finally, the display 190 can also be selectively disposed on the body 110 so that the captured image returned by the camera 300 can be played in real-time or played back by the remote control 100. In actual design process, the display 190 may be a separately provided display, or may be a mobile electronic device such as a mobile phone or a tablet computer. The display 190 and the body 110 can be connected together by wireless connection or wires to realize data transmission. Specifically, in some optional embodiments, an angle adjustment bracket is mounted on the body 110, and the display 190 is mounted on the angle adjustment bracket, thereby achieving a connection between the body 110 and the display 190. The angle adjustment bracket can be implemented in a variety of configurations, for example, it can be a linking mechanism. An adjustment of a tilt angle between the display 190 and the body 110 can be implemented by the angle adjustment bracket, thereby facilitating the photographer to view content played on the display 190. In addition, the display 190 can be powered by the battery 170 installed on the body 110, or a separate battery can also be provided.

Finally, although advantages associated with certain embodiments of the present disclosure have been described in the context of these embodiments, other embodiments may include such advantages, and not all the advantages are described in detail in the embodiments of the present disclosure. The advantages objectively resulted from the technical features in the embodiments are to be regarded as the advantages of the present disclosure which are distinguished from the existing technology, and are all within the protected scope of the present disclosure.

What is claimed is:

1. A remote control for controlling a gimbal, comprising:
   a body configured to carry a battery,
   a guiding mechanism including a guiding groove disposed on a first wheel assembly and a slider connected to the body, and
   the first wheel assembly and a second wheel assembly mounted on the body, the first wheel assembly including a first wheel, the second wheel assembly including a second wheel, and the first wheel and the second wheel rotating under a driving force to control at least two axle movements of the gimbal,
   wherein, in response to the first wheel assembly being driven to rotate about a rotation axle, the slider slides in the guiding groove to adjust a relative rotation between the first wheel assembly and the body.

2. The remote control for controlling a gimbal according to claim 1, wherein the first wheel and the second wheel are configured to control at least two movements of: a Yaw axle, a Pitch axle, or a Roll axle of the gimbal.

3. The remote control for controlling a gimbal according to claim 2, wherein:
   the first wheel is configured to control the Yaw axle movement of the gimbal, and the second wheel is configured to control the Pitch axle movement of the gimbal.

4. The remote control for controlling a gimbal according to claim 3, wherein the first wheel assembly further comprises one or more of: an on/off switch configured for activating or deactivating the first wheel assembly or the first wheel, a rotation speed control knob configured for controlling the Yaw axle of the gimbal, an adjustment knob configured for controlling a response speed of the Yaw axle of the gimbal, and a switch for switching a left-hand/right-hand operation.

5. The remote control for controlling a gimbal according to claim 3, wherein the second wheel assembly further comprises one or more of: an on/off switch configured for activating or deactivating the second wheel assembly or the second wheel, a rotation speed control knob configured for controlling the Pitch axle of the gimbal, an adjustment knob configured for controlling a response speed of the Pitch axle of the gimbal, and a switch for switching a left-hand/right-hand operation.

6. The remote control for controlling a gimbal according to claim 3, wherein the remote control further comprises: a third wheel assembly, the third wheel assembly including a rotatable third wheel configured for controlling a Roll axle movement of the gimbal.

7. The remote control for controlling a gimbal according to claim 6, wherein the third wheel assembly further comprises one or more of: an on/off switch configured for activating or deactivating the third wheel assembly or the third wheel, a rotation speed control knob configured for controlling the Roll axle of the gimbal, an adjustment knob configured for controlling a response speed of the Roll axle of the gimbal, and a switch configured for switching a left-hand/right-hand operation.

8. The remote control for controlling a gimbal according to claim 6, wherein the third wheel assembly is detachably mounted on the body.

9. The remote control for controlling a gimbal according to claim 6, wherein a groove of a tongue-and-groove connection is formed in the body, and a tongue of the tongue-and-groove connection is formed on a surface of the third wheel in contact with the body configured to be coupled with the groove of the tongue-and-groove connection.

10. The remote control for controlling a gimbal according to claim 3, wherein the first wheel assembly and the second wheel assembly are detachably mounted on the body.

11. The remote control for controlling a gimbal according to claim 3, further comprising:
a focus wheel;
wherein:
the gimbal carries a camera and a focus follower, and the focus wheel is configured for controlling the focus follower to adjust a physical aperture of the camera.

12. The remote control for controlling a gimbal according to claim 1, wherein:
a controller for setting gimbal parameters is mounted on the body, and the controller is located between the first wheel and the second wheel.

13. The remote control for controlling a gimbal according to claim 12, wherein the controller is detachably mounted on the body.

14. The remote control for controlling a gimbal according to claim 1, wherein a display is further connected to the body.

15. The remote control for controlling a gimbal according to claim 14, wherein the display is connected to the body by an angle adjustment bracket, the angle adjustment bracket being configured for adjusting a tilt angle of the display with respect to the body.

16. The remote control for controlling a gimbal according to claim 1, wherein the battery is detachably mounted on the body by an elastic mechanism.

17. The remote control for controlling a gimbal according to claim 1, wherein an output interface and an expansion interface are further disposed in the body.

18. The remote control for controlling a gimbal according to claim 1, wherein the remote control further comprises:
a wireless communication device, the wireless communication device being detachably mounted on the body.

19. The remote control for controlling a gimbal according to claim 18, wherein the wireless communication device is detachably mounted to a rear side of the body.

20. A photographing device, comprising:
a gimbal,
a camera mounted on the gimbal, and
a remote control wirelessly connected to the gimbal;
wherein the remote control comprises:
a body configured to carry a battery;
a guiding mechanism including a guiding groove disposed on a first wheel assembly and a slider connected to the body, and
the first wheel assembly and a second wheel assembly mounted on the body, the first wheel assembly comprising a first wheel, the second wheel assembly comprising a second wheel, and the first wheel and the second wheel rotating under a driving force to control at least two axle movements of the gimbal,
wherein, in response to the first wheel assembly being driven to rotate about a rotation axle, the slider slides in the guiding groove to adjust a relative rotation between the first wheel assembly and the body.

* * * * *